United States Patent Office 3,216,825
Patented Nov. 9, 1965

3,216,825
PHOTOGRAPHIC FILM ELEMENT COMPRISING BUTADIENE POLYMERIC COATINGS ON POLYETHYLENE AND OTHER POLYMERIC HYDROCARBONS
John R. Caldwell, Kingsport, Tenn., assignor to Eastman Kodak Company, Rochester, N.Y., a corporation of New Jersey
No Drawing. Filed Feb. 23, 1961, Ser. No. 90,934
5 Claims. (Cl. 96—87)

This invention concerns coatings on hyprophobic films and fibers, more particularly cross-linked polymeric coatings which may be applied to hydrocarbon films such as polyethylene and the like.

There has been a considerable problem of adhesion to various polymeric hydrocarbons, such as polyethylene, polypropylene, etc. In order to obtain adhesion, it has been necessary to modify the surface of the polymeric material by oxidation, electron bombardment, embedment of discrete particles of silica or the like in the surface, or some other treatment in order to obtain adhesion. This has been necessary in order to print on the surface. However, fibers and filaments have not been susceptible to such treatment, and it has been difficult to obtain adhesion of dyes or pigments to these materials. It has been desirable, therefore, to obtain some coating composition which could be applied to films and other substrates, but which may also be applied to fibers and filaments in order to satisfactorily adhere dyes and the like.

I have found a method of coating polymeric hydrocarbons which have not been surface-modified in order to obtain satisfactory adhesion for various coatings such as printing inks, dyes, etc.

One object of this invention is to provide a method of coating hydrophobic polyhydrocarbons with coating compositions which have good adhesion. A further object is to provide hydrophobic polyhydrocarbons which have acceptable affinity for dyes, printing inks, additional substrates, and the like. A further object is to provide coating compositions for coating hydrophobic polyhydrocarbons. An additional object is to provide composite polyhydrocarbon sheets comprising polyhydrocarbon substrates having thereon coatings having good adhesion to the substrate.

The above objects are obtained by coating a polymeric hydrocarbon with a short-chain butadiene polymer or copolymer and subsequently curing or cross-linking the polymer. The process of the invention is of particular value for the treatment of polyethylene and polypropylene films, foils and molded objects in order to make the surface receptive to dyes and printing inks. The butadiene polymer may be employed as a constituent of a printing ink for use on polyhydrocarbon films, etc. The process of the invention is useful for the treatment of polyhydrocarbon fabrics and fibers in order to impart an affinity for dyes. Fibers treated by the process show greatly improved adhesion toward coating materials such as rubber, neoprene, polyvinyl chloride, polyvinyl butyral, etc. Films treated by the process of the invention are valuable for preparing laminates with wood, metals, and the like. Treated films are less permeable to gases.

Polymeric hydrocarbons that may be treated by the process of the invention include polyethylene, polypropylene, polystyrene, poly-4-methyl pentene, polyallyl benzene, polyallyl cyclohexane, polyallyl cycloheptane, polyallyl bicycloheptane, polyvinyl cyclohexane, and poly-5-ethylhexene. In general, the process is applicable to any type of polyhydrocarbons, whether amorphous or crystalline. The process is of particular value for the treatment of films and fibers made from low-pressure, crystalline-type polyethylene and polypropylene, and from poly alpha olefins made from alpha olefins having 2–10 carbon atoms.

The butadiene polymers used in the process of the invention can be made as described in U.S. Patent Nos. 2,563,997, 2,577,677, and 2,903,440. If the butadiene polymers are made by emulsion methods, the reaction medium is usually water. Suitable surfactants include sodium stearate, potassium laurate, sodium salt of abietic acid, fatty alcohol sulfates, etc. The emulsions or latexes can have a solids content of 10–60%. These polymers are of low molecular weight, considerably less than that of the "butadiene rubbers." The polymers used in the process of the invention are gums or viscous oils that have a molecular weight less than about 30,000 and preferably a molecular weight in the range of 7,000 to 16,000. Butadiene homoploymers may be used, as well as copolymers. The copolymers should contain at least 50% by weight butadiene. Monomers which can be copolymerized with butadiene include monoolefines which contain a $CH_2=C<$ group. The monoolefines are selected from the class consisting of aryl olefines, alpha methylene carboxylic acids and their esters, nitriles, and amides, halogenated ethylenes, alkyl vinyl ethers, alkyl vinyl ketones, and vinyl pyridines. Suitable comonomers include acrylic esters and amides, methacrylic esters and amides, styrene, chloroprene, vinylpyridine, vinyl esters, etc. Other suitable classes of comonomers include the esters, amides, and ester-amides of maleic, fumaric, and itaconic acids. The copolymers and polymers may be aftertreated to introduce polar groups, such as hydroxyl, ether, ester, amide, etc.

The suitable butadiene polymers used for this invention are soluble in chlorinated solvents and aromatic hydrocarbons. Solvents for the butadiene polymers include methylene chloride, ethylene dichloride, toluene, benzene, xylene, chlorobenzene, and cyclohexane. Because of their unsaturation, the polymers cure or air dry in a relatively short time and become insoluble. The curing reaction takes place at room temperature but may be hastened by using elevated temperatures. Cobalt and manganese compounds increase the rate of cure, but other metallic dryers may also be used. The polymer may be applied to the surface of the polyhydrocarbon film, fiber, or other shaped object from solution. The amount applied will depend on the results desired. Improved adhesion of printing ink is usually obtained with a layer approximately 0.0001″ to 0.001″ thick. In order to obtain practical shades with dyes, as much as 0.001″ to 0.005″ may be required.

The coating may be cured, cross-linked and/or modified by the action of sulfur dioxide, sulfur monochloride, sulfur, rubber accelerators, such as tetramethylthiuramdisulfide, zinc dibutyldithiocarbamate, and mercaptobenzothiazole, and organic peroxy compounds.

The butadiene polymer is valuable for anchoring or bonding pigments, dyes, and other coloring or other opacifying agents to the surface. In our preferred embodiment, a 10–25% solution of the polymer is prepared in toluene or benzene, but an amount of 5–40% may be used, depending upon the ultimate purpose. To this solution may be added material such as aluminum powder, carbon black, titanium dioxide, iron oxide, phthalocyanine pigments, talc, mica, azo dyes, etc. The suspension is applied, and the solvent is evaporated. When the polymer is cured, the pigment is held firmly on the surface. Abrasive material such as carborundum or aluminum oxide may be bonded to the surface of fibers, fabrics, and films by a similar process. Oil-soluble dyes may be bonded to the surface in a similar manner.

Other polymeric materials may be mixed with the butadiene polymer to modify its properties; providing at least 50% of the mixture is the butadiene polymer. Such materials include natural rubber, synthetic rubber, Neoprene, chlorinated or chlorosulfonated polyethylene, polyacrylates, polymethacrylates, polyacrylamides, polyesters, polyurethane, alkydes, polyamides, polyepoxides, etc.

Plasticizers, drying oils, rosin acids, unsaturated fatty acids, and rosin esters may be included in the coatings to modify the properties. The butadiene polymers may be applied to the polyhydrocarbons as emulsions or latexes.

The following examples are intended to illustrate my invention but are not intended to limit it in any way.

*Example 1*

A styrene-butadiene copolymer having a molecular weight in the range of 8,000–10,000 was dissolved in benzene to give a 2% solution. A trace of cobalt napthenate was added as a curing catalyst, and aluminum flake pigment was added. The suspension was coated on polyethylene and polypropylene film to give a coating approximately 0.0005" thick, on a dry basis. The solvent was evaporated and the coated films were heated at 70–80° C. for 30 minutes. The coating showed good adhesion.

*Example 2*

Modified styrene-butadiene copolymers having a molecular weight in the range of 10,000–14,000 which are stiff gums, were prepared as described in Example 1. They were coated on polyethylene and polypropylene films and found to have excellent adhesion.

*Example 3*

Fabrics made from polyethylene and polypropylene were padded with a solution of styrene-butadiene copolymer having a molecular weight in the range of 8,000–10,000 to give an add-on of 0.3 ounce per square yard on a dry basis. The solutions contained a trace of cobalt naphthenate as curing catalyst. After the solvent was evaporated, the fabrics were heated at 70–80° C. for three hours to cure the resin. The treated fabrics had excellent adhesion for coatings of neoprene, styrene-butadiene rubber, and natural rubber. Similar results were obtained using a modified styrene-butadiene copolymer which was a stiff gum, but which had a molecular weight within the range of 8,000–10,000.

*Example 4*

An emulsion copolymer of 70/30 butadiene-styrene was made by the usual method, except that a relatively large amount of tertiary-amyl mercaptan was employed to hold the molecular weight of the copolymer down to 15,000–20,000.

The emulsion was applied to polyethylene and polypropylene fabrics to give an add-on of 0.4 ounce per square yard, on a dry basis. The water was evaporated and the fabrics were heated at 80–90° C. for two minutes. The fabrics were then exposed to vapors of sulfur monochloride for three minutes to cure the butadiene-styrene polymer.

Coatings of neoprene rubber, butadiene-styrene rubber, and natural rubber showed excellent adhesion on the treated fabric.

*Example 5*

A copolymer of 60–40 butadiene-octyl methacrylate was prepared with a molecular weight of 10,000 to 15,000. It was dissolved in benzene and a trace of cobalt naphthenate was added as a curing catalyst.

The solution was applied to a fabric made from poly-4-methyl pentene-1 to give an add-on of 0.5 ounce per square yard, on a dry basis. The solvent was evaporated and the fabric was heated at 100–110° C. for one hour to cure the resin. The fabric dyed well with cellulose acetate dyes. Coatings of neoprene rubber and natural rubber showed excellent adhesion.

Aluminum flake pigment was added to the solution and the suspension was applied to films of polyethylene, polypropylene, polystyrene, and polyallyl benzene. The coating applied was 0.001" thick. The solvent was evaporated and the coated films were heated at 80–90° C. for one hour. The coating had excellent adhesion even when the films were sharply creased. These films had reduced permeability to gases and organic vapors.

Carbon black was used in place of the aluminum pigment as described above. The coating had excellent adhesion.

Monastral Fast Blue BC (color index No. 481) was used in place of the aluminum pigment, as described above. Good adhesion was obtained.

Oil Red No. 7 (oil-soluble dye, color index No. 258) was added to the solution of butadiene copolymer and benzene. The solution was applied to films and fibers made from polyethylene, polypropylene, polystyrene, and polyallylcyclohexane. The solvent was evaporated and the treated materials were heated to 70–80° C. for two hours. The dye was firmly bonded to the surface.

*Example 6*

One part of styrene-butadiene copolymer having a molecular weight in the range of 8,000–10,000 and one part of milled natural rubber were dissolved in 20 parts of benzene and the following materials were added as vulcanizing agents: 0.1 part sulfur, 0.1 part tetramethylthiuramdisulfide, 0.04 part stearic acid, 0.1 part zinc oxide. The mixture was applied to a fabric made from crystalline polystyrene fibers. After the solvent was evaporated, the fabric was heated at 140° C. for one hour to cure the rubber. The coating had excellent adhesion. The add-on was one ounce per square yard.

*Example 7*

Photographic film base made from polyethylene, polypropylene, polystyrene and polyallyl benzene was coated with a layer of modified styrene-butadiene resin having a molecular weight in the range of 8,000–10,000. A trace of cobalt octanoate was added. The coated film was heated at 70–80° C. for 30 minutes, then exposed to sulfur dioxide for 15 minutes. Polyvinyl alcohol and gelatino silver halide photographic emulsions showed good adhesion.

*Example 8*

An emulsion copolymer of 80/20 butadiene-acrylamide was made, having a molecular weight of 8,000–12,000. The polymer was isolated from the emulsion and dried. The polymer was dispersed in ethylene dichloride and a trace of cobalt naphthenate curing catalyst was added to the solution. The solution was coated onto films of polyethylene, polystyrene, and polypropylene. The coated film was heated at 80–90° C. for 1 hour. Polyvinyl alcohol and gealtin showed excellent adhesion on the treated film.

The butadiene-acrylamide polymer was applied to a crystalline polyproplene fabric to give an add-on of 4%. After curing, the treated fabric showed good adhesion toward coatings of neoprene rubber, natural rubber, plasticized polyvinyl chloride, and plasticized polyvinyl butyral.

The coatings of my invention may be applied using well-known methods such as knife, hopper, kiss roll, and the like. They may be used to anchor various additional coatings, particularly those for use in photographic applications.

The adhesion of the coatings on the hydrophobic polyhydrocarbons was tested using the Scotch Tape test wherein the surface was scored with a sharp instrument and the Scotch Tape applied over the scored area and then forcibly removed. If the adhesion of the coating was such as to tenaciously adhere the coating to the substrate, the coating was considered satisfactory.

The invention has been described in detail with particular reference to preferred embodiments thereof but it will be understood that variations and modifications can be effected within the spirit and scope of the invention as described hereinabove and as defined in the appended claims.

I claim:
1. A photographic film product comprised of a hydrophobic polyhydrocarbon film support, a layer on the film support comprised of a cross-linked butadiene polymer containing at least about 50% by weight of butadiene and having a molecular weight of from about 7,000 to 16,000, and a light sensitive layer selected from the group consisting of a polyvinyl alcohol silver halide photographic emulsion layer and a gelatino silver halide photographic emulsion layer.

2. A photographic film product comprised of a polyolefin film support, a layer on the film support comprised of a cross-linked butadiene polymer containing at least about 50% by weight of butadiene and having a molecular weight of from about 7,000 to 16,000, and a light sensitive layer selected from the group consisting of a polyvinyl alcohol silver halide photographic emulsion layer and a gelatino silver halide photographic emulsion layer.

3. A photographic film product comprised of a polyethylene film support, a layer on the film support comprised of a cross-linked butadiene polymer containing at least about 50% by weight of butadiene and having a molecular weight of from about 7,000 to 16,000, and a light sensitive layer selected from the group consisting of a polyvinyl alcohol silver halide photographic emulsion layer and a gelatino silver halide photographic emulsion layer.

4. A photographic film product comprised of a polyethylene film support, a layer on the film support comprised of a cross-linked copolymer having a molecular weight of from about 7,000 to 16,000 and being comprised of, by weight, from about 50% to 70% of butadiene and from about 50% to 30% of styrene, and a light sensitive layer selected from the group consisting of a polyvinyl alcohol silver halide photographic emulsion layer and a gelatino silver halide photographic emulsion layer.

5. A photographic film product comprised of a polypropylene film support, a layer on the film support comprised of a cross-linked butadiene polymer containing at least about 50% by weight of butadiene and having a molecular weight of from about 7,000 to 16,000, and a light sensitive layer selected from the group consisting of a polyvinyl alcohol silver halide photographic emulsion layer and a gelatino silver halide photographic emulsion layer.

References Cited by the Examiner
UNITED STATES PATENTS

| | | | |
|---|---|---|---|
| 1,623,500 | 4/27 | Sheppard et al. | 96—87 |
| 2,537,114 | 1/51 | Young et al. | 117—155 |
| 2,676,121 | 4/54 | Chapman. | |
| 2,689,197 | 9/54 | Gerlich. | |
| 2,756,150 | 7/56 | Griggs | 96—85 X |
| 2,773,769 | 12/56 | Goldschein | 96—87 X |
| 2,875,056 | 2/59 | Smith et al. | 96—87 |
| 2,918,194 | 12/59 | Quigley. | |
| 2,922,723 | 1/60 | Lavanchy. | |
| 2,957,786 | 10/60 | Baumhart. | |
| 2,999,769 | 9/61 | Korpman. | |
| 3,013,926 | 12/61 | Railsback. | |
| 3,035,933 | 5/62 | Warner | 117—138.8 X |

OTHER REFERENCES

Paint Industry Technical Yearbook and Materials Manual, Heckel Publishing Co., Philadelphia, vol. 4, 1959, pages 38–40.

The Focal Encyclopedia of Photography, Focal Press, London and New York, 1956, pages 1065–1066.

NORMAN G. TORCHIN, *Primary Examiner.*

HAROLD N. BURSTEIN, PHILLIP E. MANGAN,
*Examiners.*